(12) United States Patent
Whitson (10) Patent No.: US 6,604,319 B2
(45) Date of Patent: *Aug. 12, 2003

(54) INTERLOCKING COMPOSITE MASONRY EDGING OR STEPPING BLOCK

(75) Inventor: Robert L. Whitson, West Bend, WI (US)

(73) Assignee: Bend Industries, Inc., West Bend, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/896,623

(22) Filed: Jun. 29, 2001

(65) Prior Publication Data

US 2002/0029516 A1 Mar. 14, 2002

Related U.S. Application Data

(63) Continuation of application No. 09/220,251, filed on Dec. 23, 1998, now Pat. No. 6,286,251, which is a continuation-in-part of application No. 29/092,264, filed on Aug. 14, 1998, now Pat. No. Des. 416,093, and a continuation-in-part of application No. 29/052,870, filed on Apr. 10, 1996, now Pat. No. Des. 435,119.

(51) Int. Cl.⁷ .................................................. A01G 1/00
(52) U.S. Cl. .......................................................... 47/33
(58) Field of Search ........................ 47/33, 86; D25/113

(56) References Cited

U.S. PATENT DOCUMENTS 121,651 A    12/1871    Moore (List continued on next page.)

FOREIGN PATENT DOCUMENTS

| DE | 2415782 | 10/1975 | |
| DE | 3807678 | 9/1989 | ............... 47/33 |
| FR | 2428786 | 12/1980 | ............... 47/86 |
| GB | 667834 | 3/1952 | |

OTHER PUBLICATIONS

Abi Hausler product catalog dated 1997, pp. 76–78.
Copy of a German product catalog featuring a retaining wall block.
Copy of a Wausau Tile product catalog featuring a paving block.

*Primary Examiner*—Charles T. Jordan
*Assistant Examiner*—Francis T. Palo
(74) *Attorney, Agent, or Firm*—Ryan Kromholz & Manion, S.C.

(57) ABSTRACT

The present invention relates to a composite masonry edging or stepping block used with other like-shaped blocks to form a continuous interconnected edging pattern or stepping path that accommodates straight sections and tight bends in the pattern or path. Each block has a series of six adjoining projections around a major portion of its perimeter, and a pair of adjoining recesses along a minor portion of its perimeter. Two adjoining projections form a multi-wave protrusion. Several combinations of two adjoining projections can be used to form a number of multi-wave protrusion. Each protrusion has the same size and shape but extends in a different angular direction. The two recesses form a multi-wave indentation. The multi-wave indentation flushly receives one of the multi-wave protrusions of an adjacent block to achieve an interlocking connection in either straight or angled alignments. The structure of each block forms a flower-like pattern. Part of the pattern is formed on the upper surface of the block by several spaced, arcuate grooves that radially extend from near the middle of the block to its perimeter. Part of the pattern is formed by the projections that have arcuate sides and beveled edges that align to smoothly continue the arcs of the grooves. The grooves and projection combine to form a series of petaline shape. Several interconnected blocks produce a flower-chain appearance.

20 Claims, 6 Drawing Sheets

U.S. PATENT DOCUMENTS

| | | |
|---|---|---|
| 1,689,164 A | 10/1928 | Sylvester |
| 1,796,973 A | 3/1931 | Wright |
| 3,073,061 A | 1/1963 | Pearson |
| 3,947,192 A | 3/1976 | Rosenberger ............ 404/41 |
| 4,349,293 A | 9/1982 | Rosenberger ............ 404/41 |
| 4,884,920 A | 12/1989 | Perazzi ............ 405/284 |
| 5,051,023 A | 9/1991 | Yoshida ............ 404/39 |
| 5,119,587 A | 6/1992 | Waltz ............ 47/33 |
| 5,159,801 A | 11/1992 | Schmidt ............ 52/575 |
| 5,186,574 A | 2/1993 | Tavares ............ 404/73 |
| 5,201,602 A | 4/1993 | Repasky ............ 404/41 |
| 5,236,179 A | 8/1993 | Schropp ............ 256/19 |
| 5,249,884 A | 10/1993 | Widmer ............ 404/42 |
| 5,564,240 A | 10/1996 | Dean ............ 52/309.1 |
| D435,119 S | 12/2000 | Whitson ............ D25/113 |

INTERLOCKING COMPOSITE MASONRY EDGING OR STEPPING BLOCK

This is a Continuation of application Ser. No. 09/220,251 filed Dec. 23, 1998 is now U.S. Pat. No. 6,286,251 issued Sep. 11, 2001, which is a Continuation-In-Part of application Ser. No. 29/092,264 filed Aug. 14, 1998, now Design U.S. Pat. No. D416,093 issued Nov. 2, 1999, and application Ser. No. 29/052,870 filed Apr. 10, 1996, now Design U.S. Pat. No. D435,119 issued Dec. 12, 2000.

TECHNICAL FIELD OF THE INVENTION

This invention relates to a composite masonry edging or stepping block having projections that form a combination of multi-wave protrusions, and recesses that form a multi-wave indentation, one protrusion of one block interlocking with the indentation of a like-shaped block in straight or angled alignments, each block having a pattern on its upper surface that includes arcuate grooves that smoothly engage the arcuate beveled sides the projections.

BACKGROUND OF THE INVENTION

Concrete or composite masonry edging blocks are commonly used to separate one landscaped surface from another. For example, edging blocks are commonly used to separate a lawn from an adjoining garden, walkway, patio or driveway. The edging blocks keep the lawn from growing into the adjoining landscaped surface and cleanly define the boundaries of the separate surfaces. The blocks are typically placed in the ground in a side-by-side manner to separate the landscaped surfaces. Concrete or composite masonry stepping blocks are also commonly used to create a path over a landscaped surface.

Various types of composite masonry edging and stepping block designs have been developed. Some designs are particularly suited for edging a straight border or creating a straight path, and others for edging angled borders or curved paths. Some block designs have an interlocking feature that helps fix adjacent blocks to each other so that a series of blocks will retain its overall shape or edged pattern or path over time.

Interlocking edging and stepping block designs can incorporate a paired block design, or a single, like-shaped block design. Paired edging block designs use blocks with different shapes to achieve the interlocking feature. One block is shaped to provide a recess, and the other is shaped to provide a projection that fits into that recess. An example of a paired block design is shown and discussed in U.S. Pat. No. 4,884,920.

Like-shaped edging and stepping block designs utilize blocks that have the same shape. Each block includes a projection on one end and a recess on the other. Blocks are placed side-by-side so that the projection of one block fits into the recess of its adjacent block. Straight sections are formed by joining blocks with projections and recesses on opposite sides of the block. Angles are formed by pivoting the projection in the recess. Examples of the like-shaped edging block designs are shown FIGS. 1 and 2.

Figure 1:
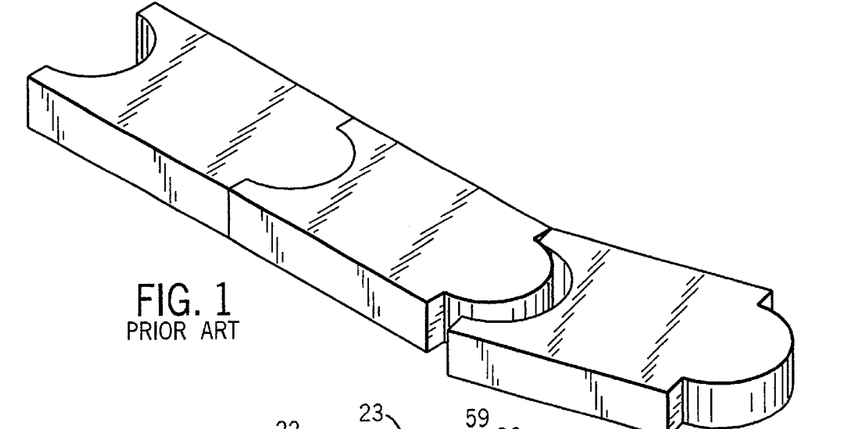
FIG. 1 is a perspective view of a conventional single piece, interlocking edging block having rectangular shaped main body with a single recess on one side and a cooperating single projection on its opposed side.

One problem with conventional like-shaped, interlocking edging and stepping block designs is that they have only one projection and only one recess, and the recess is formed on the opposite end of the block from the projection. As shown in FIG. 1, each block must be placed in line with its adjacent edge blocks to utilize the interlocking feature. While these blocks are suitable to edge a straight driveway or walkway, or create a straight path, they are not readily suited to edge landscaped surfaces with sharp bends or create curved paths.

Another problem with conventional like-shaped, interconnecting edging and stepping block designs is that the blocks cannot be used to achieve a tight bend in the edging pattern and maintain the interlocking connection between adjacent blocks. While some blocks allow a small degree of turn between adjacent interlocking blocks, they are not capable of negotiating a tight 45°, 90° or 135° bend and maintain the interlocking connection.

Figure 2:
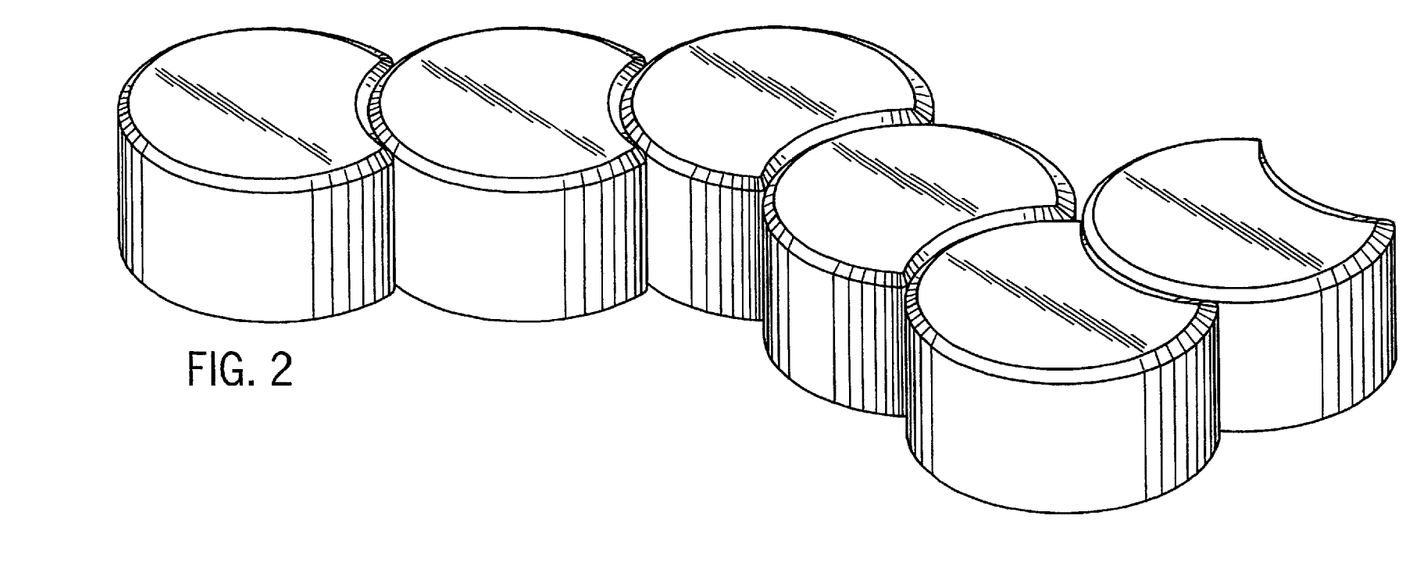
FIG. 2 is a perspective view of a conventional single piece, interlocking edging block having a substantially round shaped main body with a single recess for receiving the main body of an adjacent block.

A further problem with conventional like-shaped, interlocking edging and stepping block designs similar to the edging block shown in FIG. 2 is that they do not achieve a complete interlock. When set side-by-side, the sideways movement of a particular block relative to the edging pattern will not necessarily cause a sideways movement of its adjacent block. The adjacent block may only need to rotate to allow the sideways movement of the particular block. Because a block set in the ground can be rotated more readily than it can be pushed through the ground, this design does not inhibit undesired sideways movement of the blocks to the same degree as a complete interlock block design. Moreover, when the blocks are arranged to form a tight 45°, 90° or 135° bend, the interlocking feature is lost because the recess is not positioned to inhibit sideways movement of its adjacent block. Accordingly, the resulting edging pattern or stepping path is more prone to unwanted distortion due to human and animal contact, or frost, weather or erosion.

A still further problem with conventional like-shaped, interlocking edging and stepping block designs is that the projections and recesses do not compliment the overall design of the block. One side typically includes a single projection and the other side typically includes a single recess. The projection and indentation are not structured or positioned to compliment the overall design formed by the block or any pattern formed into the upper surface of the block.

A problem with conventional paired, interlocking edge and stepping blocks is that different block shapes are used to achieve the edging pattern. One type of block contains one or more recesses and another type of block contains one or more projections. Alternating block shapes are used every other block to achieve the interlocking pattern. This requires a person to purchase and store several different blocks to rep lace broken blocks or modify the edging pattern or stepping path in the future.

A similar problem occurs in conventional interlocking edging and stepping block designs that utilize blocks with somewhat similar shaped bodies. These blocks have projections or recesses located in different places. Blocks used to form a straight section of the edging pattern or path have the projection on one end of the block and the recess on the opposite end. Blocks used to form a curved section of the edging pattern or path have one projection or recess located one end of the block, and one projection or recess located on a side of the block. One end of the block has a smooth finish. Before going to the store to purchase the blocks, a person must not only know the number of blocks they will need for the overall length of the edging pattern or path, but the number and type of differently shaped blocks they will need to make the precise pattern. This inflexibility can frustrate the process of designing and installing the blocks. Again, several different blocks have to be bought and stored in order to replace a broken block or modify the edging pattern or path in the future.

The present invention is intended to solve these and other problems.

BRIEF DESCRIPTION OF THE INVENTION

The present invention relates to a composite masonry edging or stepping block used with other like-shaped blocks to form a continuous interconnected edging pattern or stepping path that accommodates straight sections and tight bends in the pattern or path. Each block has a series of six adjoining projections around a major portion of its perimeter, and a pair of adjoining recesses along a minor portion of its perimeter. Two adjoining projections form a multi-wave protrusion. Several combinations of two adjoining projections can be used to form a number of multi-wave protrusions. Each protrusion has the same size and shape but extends in a different angular direction. The two recesses form a multi-wave indentation. The multi-wave indentation flushly receives one of the multi-wave protrusions of an adjacent block to achieve an interlocking connection in either straight or angled alignments. The structure of each block forms a flower-like pattern. Part of the pattern is formed on the upper surface of the block by several spaced, arcuate grooves that radially extend from near the middle of the block to its perimeter. Part of the pattern is formed by the projections that have arcuate sides and beveled edges that align to smoothly continue the arcs of the grooves. The grooves and projection combine to form a series of petaline shapes. Several interconnected blocks produce a flower-chain appearance.

One advantage of the present like-shaped, interlocking edging or stepping block is that several combinations of projections can be used to form the multi-wave protrusion. Each block can be readily interlocked to an adjacent like-shaped block to form a straight section or bend in the edging pattern or stepping path. Adjacent blocks can be used to achieve a straight section or a 45°, 90° or 135° bend while maintaining the interlocking connection between adjacent blocks. Thus, the blocks are suitable to edge gardens, patios, driveways, walkways, and other landscaped surfaces having both straight and angled portions.

Another advantage of the present like-shaped, interlocking edging or stepping block is that adjacent blocks achieve a complete interlock. When placed side-by-side in an interlocking arrangement, the sideways movement of a particular block relative to the edging pattern or stepping path will impart a sideways movement of its adjacent blocks. In addition, the rotational movement of the particular block will also impart a sideways movement on its adjacent blocks. Because a block set in the ground must pushed through that ground to achieve this sideways movement, this design significantly inhibits this undesired sideways movement of the blocks. Moreover, this interlocking feature is not compromised when the blocks are arranged to form a 45°, 90° or 135° bend. The resulting edging pattern or path resists unwanted distortion due to human and animal contact, or frost, weather and erosion.

A further advantage of the present like-shaped, interlocking edge block is that only one block shape is required to achieve an edging pattern or stepping path having straight sections and bends. A person need only purchase and store one type of block to use as a replacement for broken blocks or to modify the edged pattern or path in the future. This flexibility facilitates the process of designing, installing and maintaining an edging pattern or path.

A still further advantage of the present like-shaped, interlocking edging or stepping block is that its projections compliment the overall design of the block. The projections are structured and positioned to compliment the overall design formed by the block and the pattern formed into the upper surface of the block.

A still further advantage of the present like-shaped, interlocking edging or stepping block is that they form a border with a continuous wave pattern on both sides. The side walls of the adjacent projections form the wavy sides of the border. Each of the waves forming the continuous wave pattern has the same size and shape and is spaced substantially the same distance apart from its two adjacent waves. The waves extend in an unbroken manner through the straight sections and bends in the overall edging or stepping block layout or pattern.

A still further advantage of the present like-shaped, interlocking edging or stepping block is that the block forms an edging or stepping pattern having a continuous flower chain appearance. This flower chain appearance extends in an unbroken manner through the straight sections and bends in the overall edging or stepping block layout or pattern.

A still further advantage of the present like-shaped, interlocking edging or stepping block is that the blocks can be arranged in a straight or staggered pattern. The straight alignment of the blocks produces and edging or stepping pattern having a width equal to the diameter of the blocks. The staggered alignment of the blocks produces an edging or stepping pattern that has a width greater than that of a single block. Sixteen inch diameter stepping blocks can create a path having about a twenty inch width. The wider path is easier for a person to walk across, and is achieved by using the smaller, easier to handle blocks.

Other aspects and advantages of the invention will become apparent upon making reference to the specification, claims and drawings.

DESCRIPTION OF THE PREFERRED EMBODIMENTS

While this invention is susceptible of embodiment in many different forms, the drawings show and the specification describes in detail a preferred embodiment of the invention. It should be understood that the drawings and specification are to be considered an exemplification of the principles of the invention. They are not intended to limit the broad aspects of the invention to the embodiment illustrated.

Figure 3:
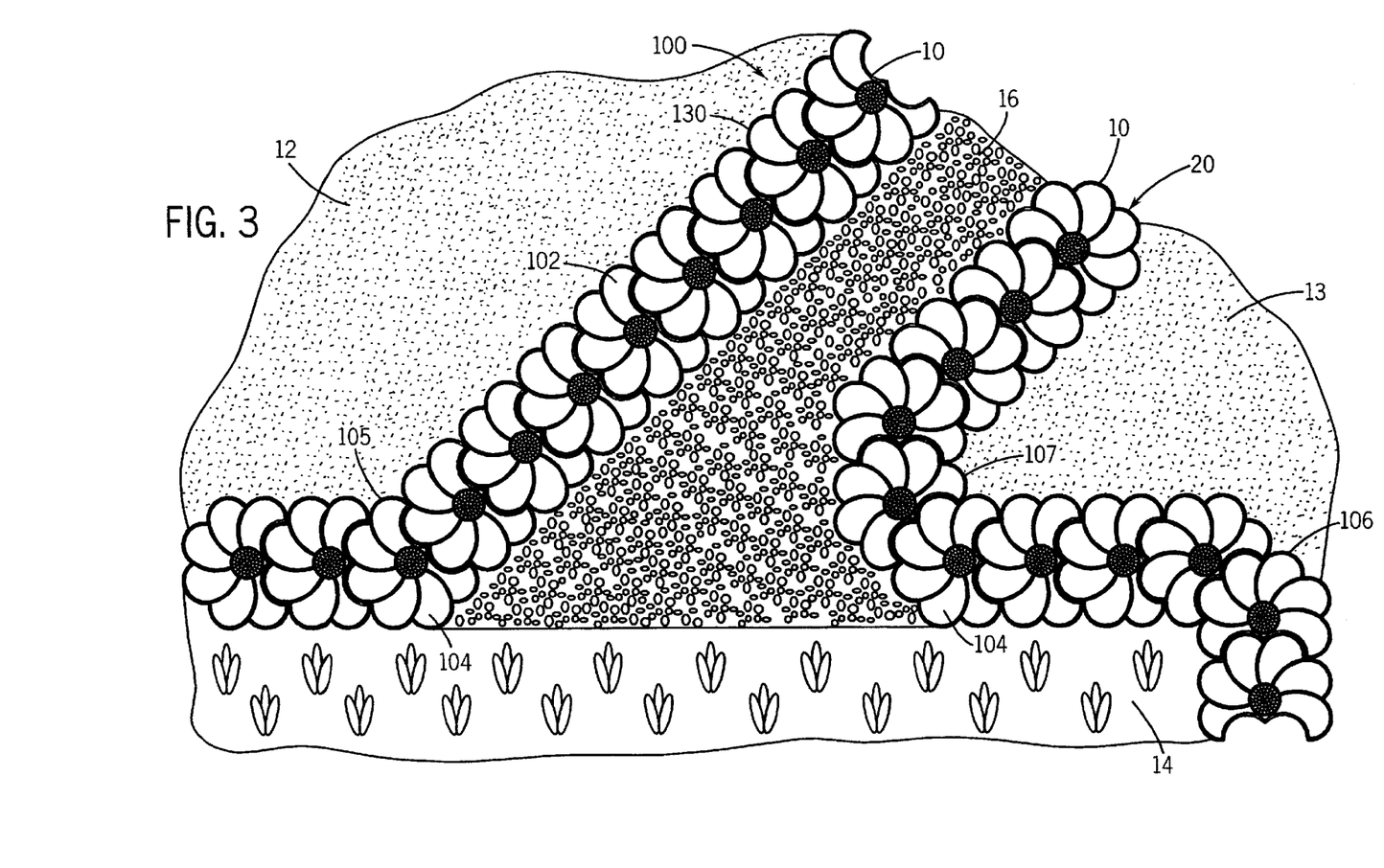
FIG. 3 is a top view showing several of the inventive, like-shaped, interlocking edging blocks arranged in a pattern for a walkway and garden having straight sections and bends of 45°, 90° and 135°.
Figure 4:
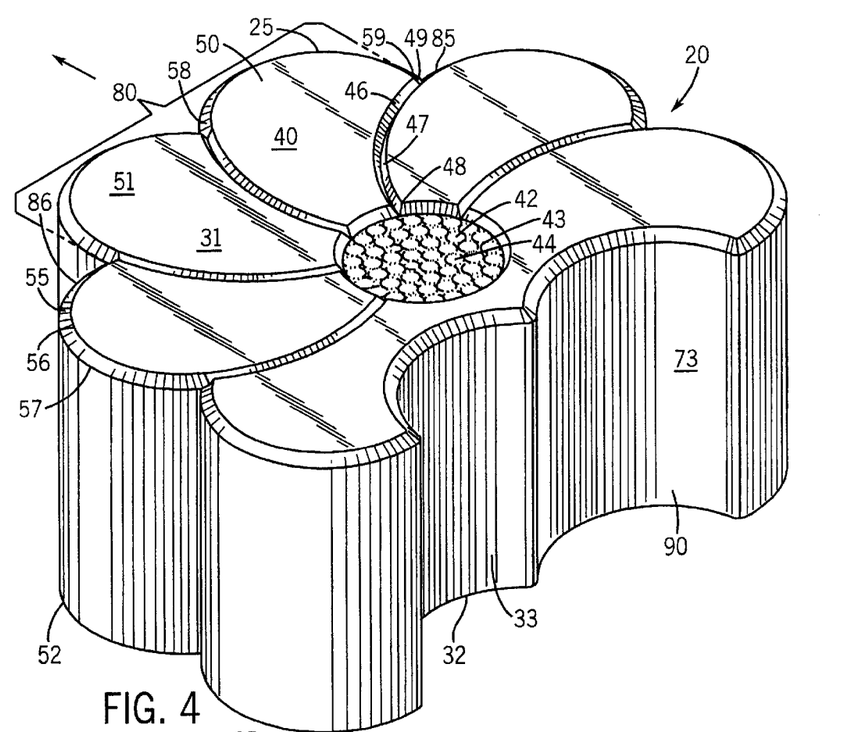
FIG. 4 is a perspective view of the inventive like-shaped, interlocking edging block having a main body with an upper surface including several radially extending arcuate grooves, several adjoining arcuate projections that smoothly mate with the arcuate grooves, and two adjoining recesses shaped to receive two adjoining arcuate projections.
Figure 6:
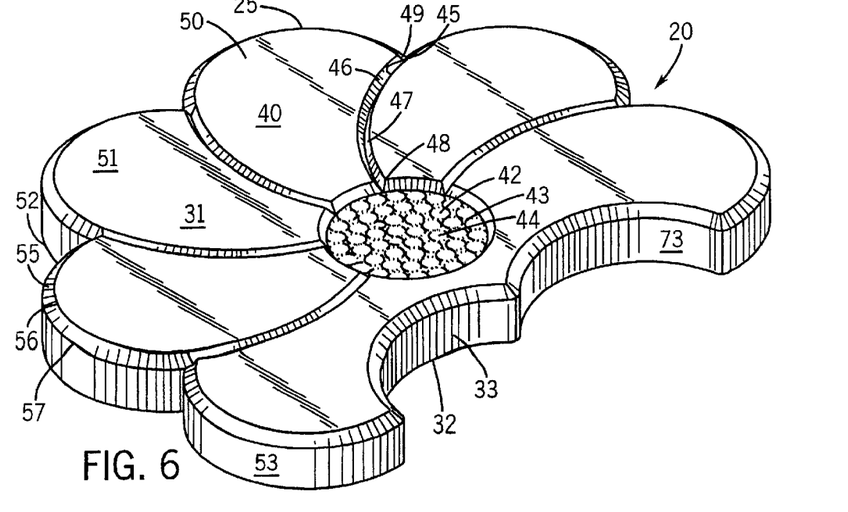
FIG. 6 is a perspective view of the inventive, like-shaped, interlocking stepping block with a thinner main body and projections.
Figure 7:
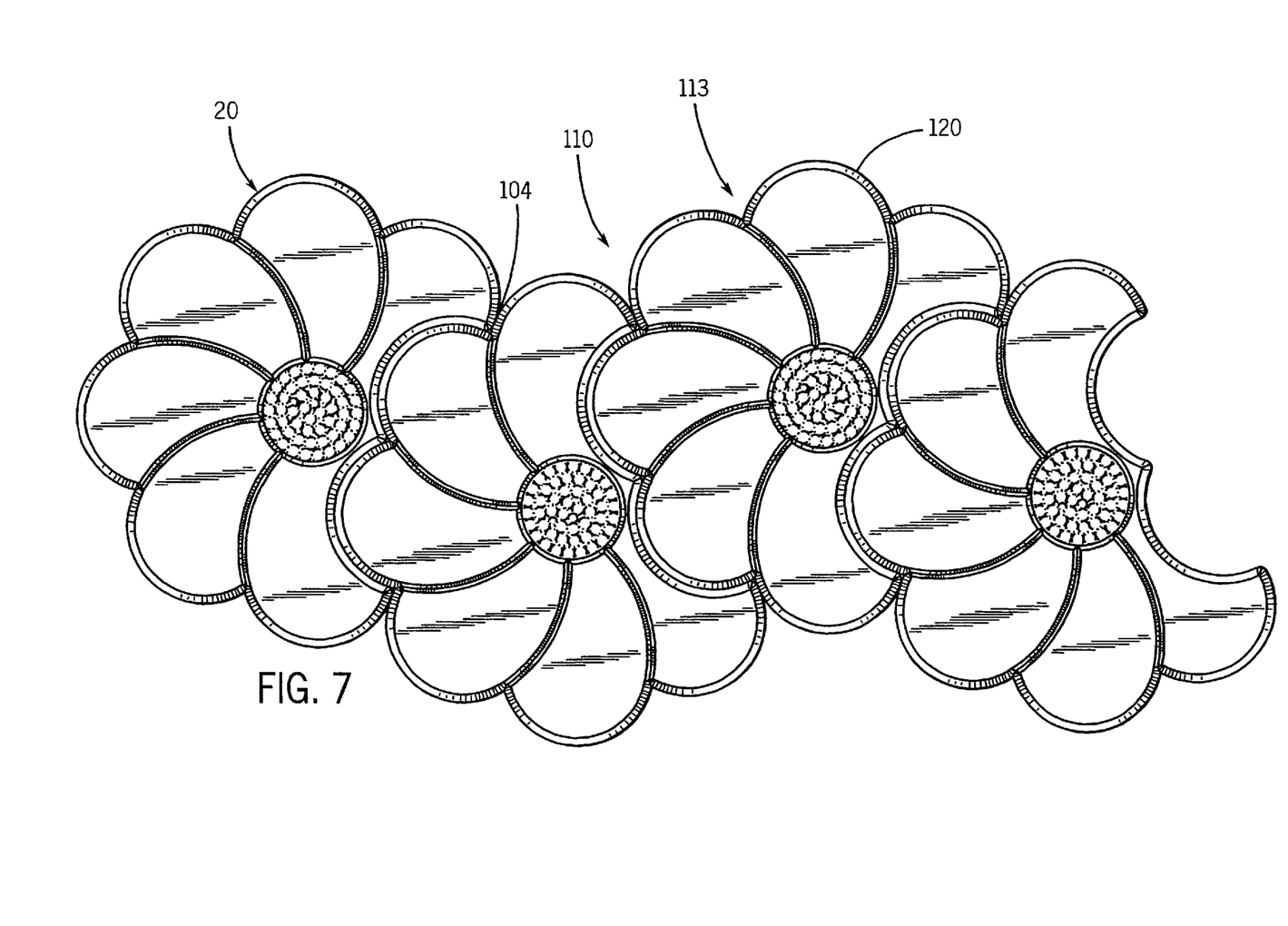
FIG. 7 is a top view showing the like-shaped, interlocking stepping blocks arranged in a staggered pattern.

The present invention relates to a composite masonry edging block that provides a border 10 to separate different landscaped surfaces such as lawn 12 and dirt 13 from a garden 14 or walkway 16 as shown in FIGS. 3 and 4, or as a thinner stepping block to creating a path over the landscaped surface as shown in FIGS. 6 and 7. The edging or stepping block is identified by reference number 20. The edging block 20 has a flower-like appearance and interlocks with other like-shaped blocks to form a desired edging pattern 100. Although the edging or stepping block is disclosed to be a composite masonry edging block such as concrete, it should be understood that other weather resistant materials such as hardened plastic or treated wood may be substituted without departing from the broad aspects of the invention.

Figure 5:
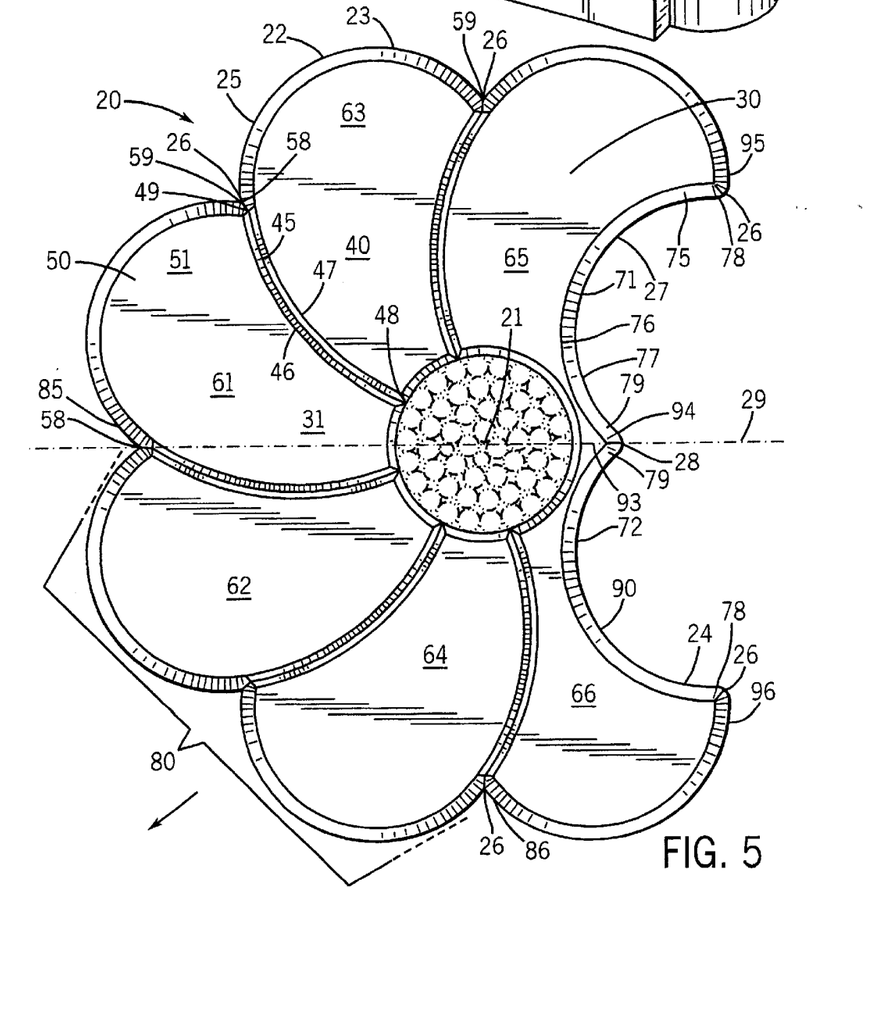
FIG. 5 is a top view of the inventive like-shaped, interlocking edging or stepping block.

As shown in FIGS. 4–6, the edging or stepping block 20 has a generally round shape that defines its center 21. The block 20 has a perimeter 22 that defines an outer horizontal margin of the block. The block 20 is about six inches in diameter when used as an edging block and sixteen inches in diameter when used as a stepping bock. The perimeter 22 is divided into major and minor sections 23 and 24. The major section 23 is formed by a series of six convex shaped waves 25. Each convex wave 25 has the same size and arcuate shape as, and is spaced the same distance apart from, the other convex waves. Adjacent convex waves 25 intersect at points 26 that form the lowest points of each convex wave or the points closest the center 21. The minor section 24 is formed by two concave shaped waves 27. Each concave wave 27 has the same size and arcuate shape as the other. The two concave waves intersect at a high point 28. The convex and concave waves 25 and 27 form a continuous wave pattern around the perimeter 22 of the block 20. A line of symmetry 29 passes through the center 21, the middle of the seven low points 26, and high point 28. The line of symmetry divides the edging block 20, its perimeter 22, and its major and minor sections 23 and 24 in half. Three of the convex waves 25 and one of the concave waves 27 are on one side of the line of symmetry, and three of the convex waves and one of the concave waves are on the other.

The edging or stepping block 20 has a main body 30 with substantially parallel upper and lower surfaces 31 and 32, and a solid interior 33 that joins the two surfaces. The main body 30 has a generally round or octagonal shape that connects the low points 26 of the perimeter 22. The lower surface 32 has a generally flat and smooth finish. The upper surface 31 includes a pattern 40.

As best shown in FIG. 5, the pattern 40 includes a depressed middle portion 42 defined by a circular ring or edge 43 with the center 21 of the block 20 as its origin. The middle portion 42 has a speckled interior 44 to resemble the middle of a flower. A series of five arcuate bands or grooves 45 are formed into the upper surface 31 of the main body 30. The arcuate shape of each groove 45 forms a partial circle with a diameter greater than the radius of the block 20. The grooves 45 have the same arcuate shape and are bowed in a counterclockwise direction. Each groove 45 is formed into the upper surface 31 in a V-shaped cross-sectional shape. Each V-shaped groove 45 has two sides 46 and 47. Each groove 45 extends from the edge 43 of the middle portion 42 to about low point 26 on the perimeter 22 of the block 20. One end 48 of the groove 45 intersects the edge 43 of the middle portion 42. Another end 49 of the groove 45 intersects the perimeter 22 of the block 20 on or near low point 26. The arcuate grooves 45 are spaced equidistantly apart from each other at 45° intervals in a fan-like array. While the pattern 40 is shown to be formed into the upper surface 31 of the main body 30, it should be understood that the pattern could be formed by raised portions, off-set portions or possibly different colored portions without departing from the broad aspect of the invention.

A series of six adjoining projections 50 extend outwardly from the main body 30 of the block 20. Each projection 50 has the same size and shape as the other five projections. The projections are equidistantly spaced from their adjacent projections and extend in a continuous manner around the major portion 23 of the perimeter 22 of the block 20. Each projection 50 has an upper surface 51, a lower surface 52 and a side wall 53. The upper and lower surfaces 51 and 52 are substantially parallel to and smoothly extend from the upper and lower surfaces 31 and 32 of the main body 30, respectively. The side walls 53 are substantially vertical and perpendicular to the upper and lower surfaces 51 and 52 when viewed from the side. The height of the side walls 53 are about 2⅜ inches thick for the edging block shown in FIG. 4, and about 1⅝ inches thick for the stepping block shown in FIG. 6.

The side walls 53 of the projections 50 have an arcuate shape when viewed from above as in FIG. 5. The arcuate shape of each side wall 53 forms a partial circle with a diameter less than the radius of the block 20. The side walls 53 have the same arcuate shape as the other side walls, and combine to form the major portion 23 of the perimeter 22 of the block 20. The side wall 53 of each projection 50 forms one of the convex waves 25 of the perimeter 22, and spans one-eight (⅛) or 45° of the circumference of the block 20. A 45° bevel 55 is formed at the intersection of the side wall 53 and upper surface 51 of each projection 50. The bevel 55 has inner and outer side edges 56 and 57, and spans from one end 58 of the projection 50 to the other 59.

Five of the six projections 50 are matched with five corresponding arcuate grooves 45. The sixth projection 50 does not have a corresponding groove 45. Each of the matched projections 50 is aligned on the main body 30 so that the end 58 of the side wall 53 engages the outer end 49 of its corresponding arcuate groove 45. This end 58 of the side wall 53 smoothly engages the outer end 49 of the arcuate groove 45 at or near the low point 26. The arcuate shape of the side wall 53 smoothly joins the arcuate shape of the groove 45. When viewed from above, a line tangent the arc formed by the side wall 53 at end 58 is substantially parallel to a line tangent the arc formed by groove 45 at end 49. In other words, the outer end 49 of each groove 45 has the same angle relative to the line of symmetry 29 as the end 58 of its corresponding side wall 53. The V-shaped grooves 45 and bevels 55 have the same 45° angle relative to upper surfaces 31 and 51, respectively, so that the end 58 of the bevel 55 is flush with the outer end 49 of the groove 45. The inside edge 56 of the bevel 55 is aligned with one side 46 of the groove 45. The outside edge 57 of the bevel 55 is aligned with the other side 47 of the groove 45. The above features combine to provide the smooth engagement of the groove 45 and bevel 55, and allow the projections 50 to smoothly extend and compliment the pattern 40 formed into the main body 30.

Each arcuate groove 45 and corresponding arcuate bevel 55 creates a continuous petaline shaped curve that defines one of six petaline or semi-petaline shaped segments 61–66. The terminal end 59 of the petaline shaped curve intersects its adjacent petaline segment at the low point 26 where the adjacent projection 50 meets its corresponding arcuate groove 45. The terminal end 59 of the petaline curve intersects the adjacent petaline segment 61–66 at an angle substantially perpendicular to its petaline curve at low point 26. Three of the six projections 50 extend from the main body 30 on one side of the line of symmetry 29, and the other three projections extend from the main body on the other side of the line of symmetry 29. Each projection extends in a given rotational direction from the main body 30 relative to the center 21.

The two petaline segments adjacent the line of symmetry 29 are middle segments 61 and 62. The next two adjacent segments are intermediate segments 63 and 64. The next two adjacent segments are outer segments 65 and 66. The line of symmetry 29 passes through the low point 26 where the outer end 49 of arcuate groove 45 meets the end 58 of the beveled side wall 53 of petaline segment 61. This is also the point where the terminal end 59 of the beveled side wall 53 of middle segment 62 intersects the petaline curve of segment 61.

Two adjoining recesses 71 and 72 are formed in the side of the main body 30. Each recess 71 and 72 has a side wall 73 that is substantially perpendicular to the upper and lower surfaces 31 and 32 of the main body 30. The side walls 73 have the same arcuate or partial circular shape. The arcuate shape of the side walls 73 of the recesses 71 and 72 are substantially the same as the circular shape of the side walls 53 of the projections 50. A 45° bevel is formed where the side walls 73 meet the upper surface 31 of the main body 30. Each recess forms one-eighth (⅛) or 45° of the circumference of the block 20. The side walls 73 of the two recesses form the minor portion 24 of the perimeter of the block 20, or about one-quarter (¼) or 90° of the total circumference of the block. Each bevel 75 has inside and outside edges 76 and 77, and two ends 78 and 79.

The projections 50 of two adjoining petaline segments 61–66 form a multi-wave protrusion 80. A centerline of the protrusion 80 formed by the projections 50 of the middle petaline segments 61 and 62 lays on the line of symmetry 29 so that the protrusion can be said to extend in a direction along the line of symmetry. The multi-wave protrusion 80 formed by the projections 50 of petaline segments 61 and 63 extends in a direction 45° above the line of symmetry 29. The multi-wave protrusion 80 formed by the projections 50 of petaline segments 62 and 64 extends in a direction 45° below the line of symmetry 29. The multi-wave protrusions 80 formed by the projections 50 of petaline segments 63 and 65, and 64 and 66 extend opposite each other and in a direction substantially perpendicular to the line of symmetry 29.

Each multi-wave protrusion 80 has a pair of shoulders 85 and 86 formed by the side walls 53 of its two adjacent projections 50. The shoulders 85 and 86 of the multi-wave protrusion 80 formed by the projections 50 for petaline segments 61 and 62 are formed by the end 58 of the side wall 53 of petaline segment 63 and the end 59 of the side wall of petaline segment 64, respectively. The shoulders 85 and 86 of the multi-wave protrusion 80 formed by the projections 50 for petaline segments 61 and 62 are formed by the end 58 of the side wall 53 of petaline segment 63 and the end 59 of the side wall of petaline segment 64, respectively. The shoulders 85 and 86 of the multi-wave protrusion 80 formed by the projections 50 for petaline segments 62 and 64 are formed by the end 58 of the side wall 53 of petaline segment 61 and the end 59 of the side wall of petaline segment 66, respectively.

The two adjoining recesses 71 and 72 form a multi-wave indentation 90. The multi-wave indentation 90 is shaped to flushly receive one of the multi-wave protrusions 80. A centerline of the multi-wave indentation 90 lays on the line of symmetry 29, so that the indentation can be said to extend into the main body 30 in the same direction as the line of symmetry 29 and the multi-wave wave protrusion 80 formed by the projections 50 of petaline segments 61 and 62. One end 78 of each side wall 73 meets its adjoining projection 50 at the low point 26 to form a 90° angle with that side wall 53. The other ends 79 of the recesses 70 and 71 meet at the high point 28 to form a projection or extension 93 with an angled tip 94 having a 90° angle. The multi-wave indentation 90 has a pair of shoulders 95 and 96 formed by the side walls 53 of its two adjacent projections 50. The shoulders 95 and 96 are formed by the end 59 of the side wall 53 of petaline segment 65 and the end 58 of the side wall of petaline segment 66, respectively. The outer ends 26 or 78 of the recesses 70 and 71 forming the multi-wave indentation 90 and the middle ends 28 or 79 define the center 21 of the adjacent block 20.

The like-shaped edging blocks 20 are placed side-by-side to form a continuous interlocking edging pattern 100 that accommodates straight sections 102 and bends 104, such as bends 105, 106 and 107 in the pattern as shown in FIG. 3. Each like-shaped block 20 has the same or substantially the same shape as the other blocks. To form a straight section 102 in the pattern 100, a first block 20 is set in place along the pattern so that its line of symmetry 29 is parallel or tangent to the pattern. A second block 20 is then aligned so that its multi-wave protrusion 80 formed by the middle petaline segments 61 and 62 is inserted into the multi-wave recess 90 of the first block. The side walls 53 of the protrusion 80 flushly engage the side walls 73 of the indentation 90 to form an interlocking connection. The two blocks 20 share the same line of symmetry 29 and their indentations 90 extend in the same direction along that line of symmetry. Several blocks can be aligned in this manner to form the straight section 102 with a desired length.

The blocks 20 are also used to form bends 104 of 45°, 90° and 135° in the pattern 100. To form a 45° bend 105, the second block 20 is positioned so that its protrusion 80 formed by petaline segments 61 and 63, or 62 and 64, is inserted into the indentation 90 of the first block. The line of symmetry 29 and indentation 90 of the second block 20 is now 45° out of alignment with the first block 20. A straight section 102 can be formed off the second block in the new direction. A 90° bend 106 is formed by positioning a third block so that its protrusion 80 formed by petaline segments 61 and 63, or 62 and 64, is inserted into the indentation 90 of the second block. The line of symmetry 29 and indentation 90 of the third block 20 is now 90° out of alignment with the first block 20. A 135° bend 107 is formed by positioning a fourth block so that its protrusion 80 formed by petaline segments 61 and 63, or 62 and 64, is inserted into the indentation 90 of the third block. The line of symmetry 29 and indentation 90 of the fourth block 20 is now 135° out of alignment with the first block 20. The straight sections 102 can be formed off the third or fourth blocks in either of these new directions.

The stepping blocks can be arranged in a staggered pattern 110 as shown in FIG. 7. This is done by alternating from the protrusion 80 formed by the projections 50 of petaline segments 61 and 63 and the protrusion formed by the projections of petaline segments 62 and 64. The stepping blocks have a sixteen (16) inch diameter. The staggered pattern 110 produces a path with about a twenty (20) inch width. The stepping blocks 20 can also be arranged in a pattern 100 that includes straight sections 102 as well as bends 104, such as bends 105, 106 and 107.

Figure 8:
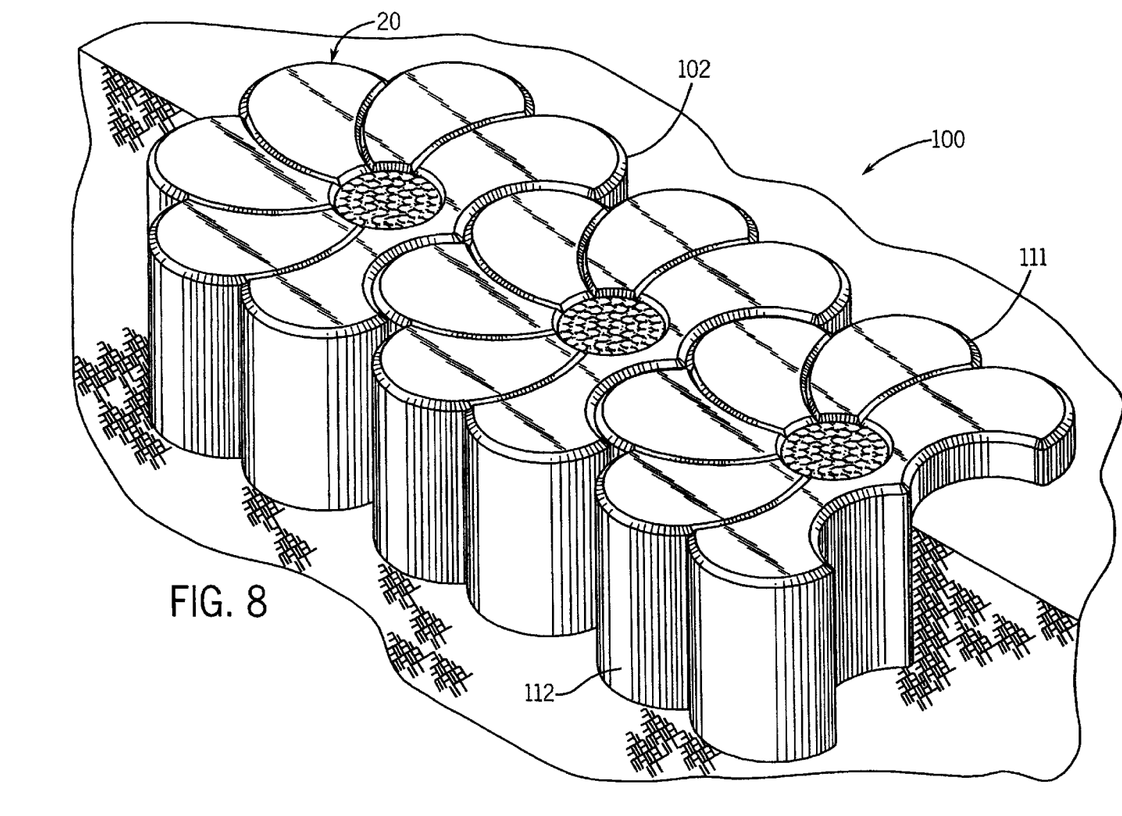
FIG. 8 is a perspective, partial cut-away view showing the like-shaped, interlocking edging or stepping blocks set in the ground.

Adjacent blocks 20 form a complete interlock that inhibits both rotational and tangential movement of the blocks placed in the pattern 100. As shown in FIG. 8, the blocks 20 are typically set in a trench in the ground 13 so that compacted dirt abuts two sides 111 and 112 of the pattern 100. The rotation or sideways movement 113 of any interlocking block 20 in the pattern 100 will require a sideways movement of at least both its adjacent blocks. Because the sideways movement of the blocks is resisted by the compacted ground 13 around the blocks 20, the interlocking blocks tend to stay in their intended place. Human and animal contact that tends to push or rotate one block 20 out of alignment with the others is resisted by the compact dirt 13 around that particular block and its adjacent blocks. The interlocking nature of the blocks 20 is achieved in both straight sections 102 or bends 104 formed in the pattern 100, or in a staggered pattern 110.

The overall block layout 100 forms a border with sides having a continuous wave pattern 120. The interlocking fit of adjacent blocks 20 enable the side walls 53 of those adjacent blocks 20 to come together to form a continuous wave pattern 120. Each convex wave 25 in the pattern 120 has the same size and shape and is spaced substantially the same distance apart from its adjacent waves. The continuous wave 120 extends along the length of the layout 100 in an unbroken manner along the straight sections 102 and the bends 104. The complete design 40 of the blocks 20 also combine to produce a flower chain appearance 130. The continuous flower chain 130 extends along the length of the layout 100 or 110 in an unbroken manner along the straight sections 102 and bends 104 formed in the layout.

While the invention has been described with reference to a preferred embodiment, it will be understood by those skilled in the art that various changes may be made and equivalents may be substituted without departing from the broader aspects of the invention. For example, while the block 20 is shown and described as having a pattern 40 with five arcuate grooves 45 that align with six arcuate projections 50 and having two adjoining recesses 70 and 71, it should be understood that more grooves, projections and recesses can be used to achieve an interlocking block with multi-wave protrusions 80 and a multi-wave indentation 90. In addition, while the lower surface 32 of the main body 30 of the block 20 is shown to be flat and smooth, it should be understood that the lower surface could contain a pattern different from pattern 40 so that the person laying out the pattern 100 or 110 could alternate patterns by flipping the blocks over when desired.

I claim:

1. An interlocking composite masonry edging or stepping block comprising:
   a main body having a predetermined thickness and an upper surface;
   a series of adjacent projections extending around a first portion of said main body of the block, each of said projections having a substantially similar arcuate shaped side wall, and at least two of said adjacent projections combining to form a multi-wave protrusion;
   a series of adjacent recesses formed along a second portion of said main body of the block, each of said recesses having a substantially similar arcuate shaped side wall, and at least two of said adjacent recesses combining to form a multi-wave indentation, said multi-wave indentation being substantially similar in size and shape to said multi-wave protrusion; and,
   said multi-wave indentation of one edging block being adapted to receive said multi-wave protrusion of another like-shaped block to form an interlocking connection between the blocks.

2. The interlocking composite masonry edging or stepping block of claim 1, and wherein said indentation has an extension, said extension being adapted to be received between said projections forming said protrusion of the other block.

3. The interlocking composite masonry edging or stepping block of claim 2, and wherein said multi-wave indentation are adapted to flushly receive said multi-wave protrusion of the other block.

4. The interlocking composite masonry edging or stepping block of claim 3, and wherein said side walls of said projections forming said protrusions of the block are adapted to flushly engage said side walls of said recesses forming said indentation of the other block.

5. The interlocking composite masonry edging or stepping block of claim 4, and wherein said protrusion has shoulders and said indentation has shoulders, and said shoulders of said protrusion of the block are adapted to engage said shoulders of said indentation of the other block.

6. The interlocking composite masonry edging or stepping block of claim 1, and wherein said adjacent projections extend around said first portion of said main body of the block in a substantially continuous manner, and said adjacent recesses are formed along said second portion of said main body of the block in a substantially continuous manner.

7. The interlocking composite masonry edging or stepping block of claim 6, and wherein the block has a substantially round shape and a center.

8. The interlocking composite masonry edging or stepping block of claim 7, and wherein the block has a line of symmetry, and wherein half of said projections are located on each side of said line of symmetry and half of said recesses are located on each side of said line of symmetry.

9. The interlocking composite masonry edging or stepping block of claim 8, and wherein said indentation has an extension, said multi-wave protrusion is formed by two of said adjacent projections, said multi-wave indentation is formed by two of said adjacent recesses, and said extension of said multi-wave indentation extends along said line of symmetry.

10. The interlocking composite masonry edging or stepping block of claim 9, and wherein said multi-wave protrusion is adapted to be formed from different combinations of adjacent projections, and wherein each different combination of adjacent projections forming said multi-wave protrusion extends in a different angular direction from said main body.

11. The interlocking composite masonry edging or stepping block of claim 10, and wherein said line of symmetry passes through said center, each projection spans one eighth of the circumference of the block, and said different angular directions of said multi-wave protrusion are 0°, 45° and 90° relative to said line of symmetry.

12. The interlocking composite masonry edging or stepping block of claim 1, and wherein the block has a perimeter, and said adjacent projections combine to form a major portion of said perimeter and said adjacent recesses combine to form a minor portion of said perimeter.

13. The interlocking composite masonry edging or stepping block of claim 12, and wherein said projections form a substantially continuous wave pattern around said major portion of said perimeter of the block.

14. The interlocking composite masonry edging or stepping block of claim 13, and wherein said main body has a lower surface substantially parallel to said upper surface, and each side wall is substantially perpendicular to said upper and lower surfaces.

15. The interlocking composite masonry edging or stepping block of claim 14, and wherein each of said projections has an upper surface that is substantially parallel to and smoothly extend from said upper surface of said main body, and each of said projections has a lower surface that is substantially parallel to and smoothly extends from said lower surface of said main body.

16. The interlocking composite masonry edging or stepping block of claim 15, and wherein said side walls of each of said adjacent projections intersect at a low point.

17. The interlocking composite masonry edging or stepping block of claim 16, and wherein said extension has a tip, and said side walls of each of said adjacent recesses intersect at a high point located at said tip.

18. The interlocking composite masonry edging or stepping block of claim 1, and wherein a plurality of the blocks are adapted to form a side-by-side layout having straight sections and bends.

19. The interlocking composite masonry edging or stepping block of claim 18, and wherein said layout has a continuous wave pattern along at least one side of said layout, said wave pattern being formed by said projections of said like-shaped blocks.

20. The interlocking composite masonry edging or stepping block of claim 1, and wherein a plurality of the blocks are adapted to form a side-by-side layout having a staggered pattern.

* * * * *